United States Patent [19]

Fukushima et al.

[11] 4,394,333
[45] Jul. 19, 1983

[54] PROCESS FOR THE PRODUCTION OF BLOW MOLDED ARTICLES ACCOMPANIED WITH THE RECOVERY OF A BLOWING GAS

[75] Inventors: Hatahiko Fukushima, Katano; Tadahiko Handa, Takarazuka; Kenji Kodama, Hirakata, all of Japan

[73] Assignee: Air Products and Chemicals, Inc., Allentown, Pa.

[21] Appl. No.: 259,140

[22] Filed: Apr. 30, 1981

[30] Foreign Application Priority Data

May 9, 1980 [JP] Japan .................................. 55/62086

[51] Int. Cl.³ ...................... B29C 17/07; B29C 25/00
[52] U.S. Cl. ......................................... 264/37; 264/83;
264/523; 264/526; 264/540; 425/72 R; 425/535
[58] Field of Search .................. 264/37, 83, 523, 526, 264/528, 540; 425/72 R, 522, 535

[56] References Cited

U.S. PATENT DOCUMENTS

| | | | |
|---|---|---|---|
| 3,065,501 | 11/1962 | Gasmire | 264/526 X |
| 3,789,093 | 1/1974 | Bose | 264/37 |
| 3,862,284 | 1/1975 | Dixon et al. | 264/526 X |
| 4,126,657 | 11/1978 | Gado | 264/37 X |

FOREIGN PATENT DOCUMENTS 2924797  1/1980  Fed. Rep. of Germany ...... 264/523

*Primary Examiner*—Jan H. Silbaugh
*Attorney, Agent, or Firm*—Mark L. Rodgers; E. Eugene Innis; James C. Simmons

[57] ABSTRACT

In a blow molding process in which a parison is blown with a blowing gas containing a reactive gas component capable of reacting with the inner walls of the parison, the blowing gas is removed from the resulting blown article with a purging gas and stored for reuse. The mixture of blowing and purging gases in a reserve tank or other suitable means is adjusted to a certain level of pressure and reactive gas concentration and then recycled as the blowing gas in a subsequent blow molding step. The resulting blown articles from this process have improved properties, e.g. improved impermeability against non-polar solvents when fluorine is the reactive gas.

14 Claims, 1 Drawing Figure

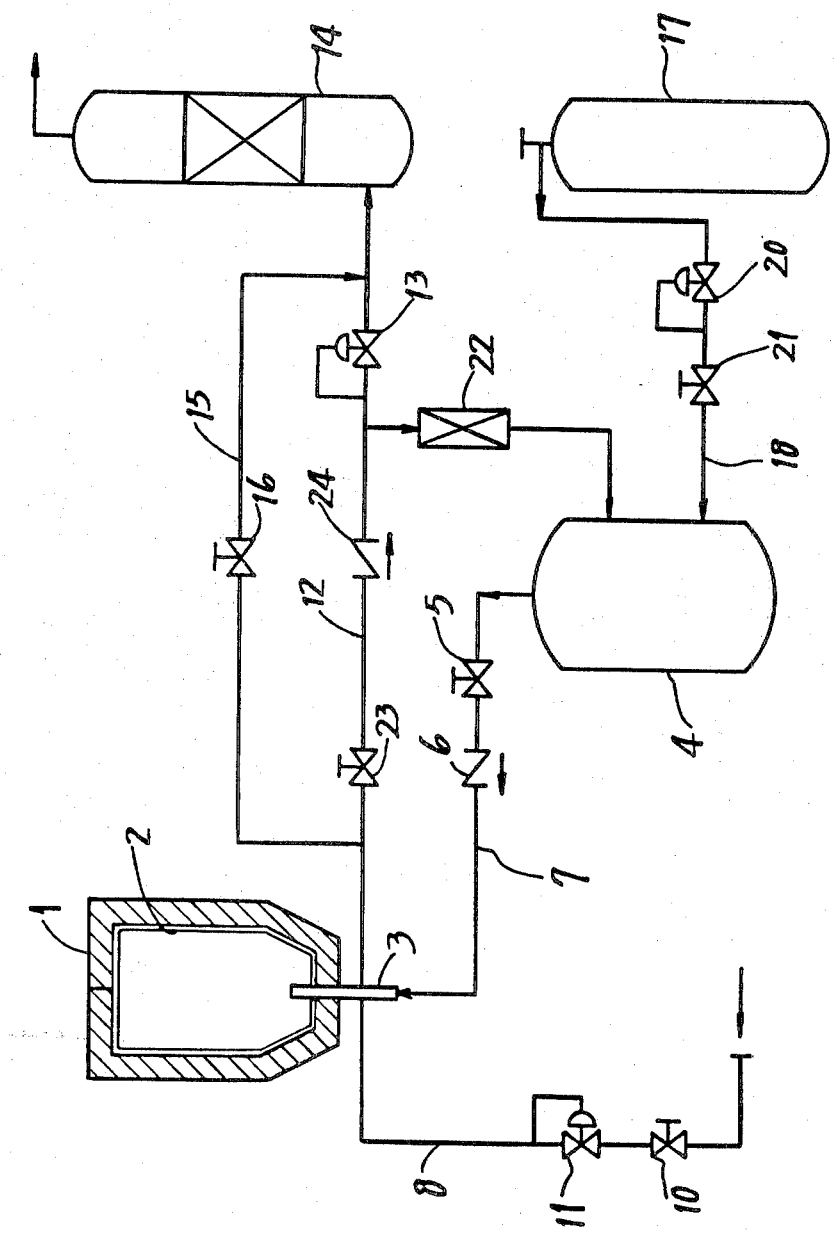

PROCESS FOR THE PRODUCTION OF BLOW MOLDED ARTICLES ACCOMPANIED WITH THE RECOVERY OF A BLOWING GAS

TECHNICAL FIELD

This invention relates to a process for the production of blow molded articles in which the blowing gas is recovered and recycled for reuse. In particular, it relates to using as the blowing gas a treating gas for treating the inner surface of a blow molded article during the blow molding process in order to obtain a blow molding article having improved properties such as improved impermeability against the fluid contained therein.

BACKGROUND OF THE PRIOR ART

In the prior art methods, blow molded articles are produced by extruding a hollow tube of a thermoplastic material in a molten state (hereinafter referred to as "parison"), and clamping said parison within a mold and blowing a blowing gas into the parison to expand the parison through a blow pin inserted into the mold. It is known to employ a reactive gas such as fluorine or a blowing gas containing a reactive component such as fluorine to improve the fluid impermeability of the resulting blow molded thermoplastic articles such as blow molded containers; see U.S. Pat. No. 3,862,284, the description of which is incorporated herein by reference. The method disclosed in this patent comprises blowing a parison with a treating gas containing 0.1 to 10% by volume fluorine and 99.9 to 90% by volume inert gas to form an article of, for example, polyethylene, in the mold and then after a cooling stage, purging the gas within the article with an inert gas.

BRIEF SUMMARY OF THE INVENTION

In accordance with the process of the present invention for producing blow molded thermoplastic articles having improved properties through the use of a treating gas as the blowing gas, the treating gas while still containing a high concentration of a reactive gas component during the initial stage of purging is recovered and passed to a reserve storage means. Therefore, a primary object of the present invention is to provide an improved process for producing blow molded articles with the recovery of the blowing gas which is recycled for reuse as the blowing gas during the subsequent molding operations.

BRIEF DESCRIPTION OF THE DRAWING

The drawing is a process flow diagram illustrating one embodiment of the present process for producing blow molded articles with the recovery of a blowing gas wherein: 1=Mold, 2=Molded Container, 3=Blow Pin, 4=Reserve Tank, 5=Solenoid Valve, 6=Check Valve, 7=Blowing Gas Line, 8=Purge Line, 10=Solenoid Valve, 11=Pressure Regulator, 12=Recovery Line, 13=Back Pressure Regulator, 14=Scrubber, 15=Exhaust Line, 16=Solenoid Valve, 17=Reactive Component Gas Cylinder, 18=Reactive Component Gas Line, 20=Pressure Regulator, 21=Solenoid Valve, 22=Gas Refining Column, 23=Solenoid Valve, and 24=Check Valve.

DETAILED DESCRIPTION OF THE DRAWING

The process of the present invention will become more clearly understood from the following detailed description and its reference to the drawing. Mold 1 is shown in its closed position enclosing therewithin blow molded container 2. Blow pin 3 is shown in its fully extended position through mold 1 into a top of inverted container 3. Initially, a parison (not shown) is clamped within mold 1, a treating gas (e.g. 2 volume percent fluorine/98 volume percent nitrogen at 7 kg./cm$^2$ absolute) which has been adjusted to a certain pressure and reactive gas component concentration in reserve tank 4 is blown into the interior of the parison within mold 1 through solenoid valve 5 and check valve 6 in blowing gas line 7. Consequently, the parison is expanded to form blow molded container 2 as shown in the drawing. After blow molded container 2 is formed within mold 1, the pressure of reserved tank 4 and that of blow molded container 2 becomes substantially equal (e.g. 5 kg./cm$^2$ absolute). At this time, solenoid valve 10 in purging gas line 8 is opened and a purging medium or gas is passed through solenoid valve 10 and regulator valve 11 into molded container 2 to purge out the treating gas. The purging medium can be nitrogen, carbon dioxide, argon, air and the like as well as liquefied nitrogen and liquefied carbon dioxide. The purging gas pressure is controlled by means of pressure regulator 11 in purging gas line 8 and back pressure regulator 13 in recovery line 12. It is preferred that the working pressure of back pressure regulator 13 is set at slightly lower than that of the pressure regulator 11, for instance, 0.5–3 kg/cm.$^2$ higher than the blowing gas pressure of about 5 kg/cm.$^2$.

A compressor (not shown) can be used in place of back pressure regulator 13 in recovery line 12 through which the blowing gas that is recovered for recycle in the blowing operation is passed. It is also possible to operate the present process by controlling the gas flow with timers to actuate each of the solenoid valves 5 and 10 and to utilize valve 13 as a safety relief valve.

The purging gas exhausted from container 2 after it has come in contact with the interior walls and while it still contains a fairly high concentration of the reactive gas component is recovered and passed into reserve tank 4 for a period of time until the pressure builds up within reserve tank 4 to the desired set-up pressure of back pressure regulator 13. After the pressure in recovery line 12 reaches the set-up pressure of back pressure regulator valve 13, valve 13 opens and the remaining purge gas from the interior of container 2 passes into scrubber 14 where the gas is scrubbed, for example, with water, to remove the reactive gas component before the gas is discharged from the system. After a fixed period of time of the purging step, solenoid valve 16 in exhaust line 15 is opened and any gas remaining within molded container 2 is rapidly exhausted into scrubber 14. Mold 1 is then opened and blow molded container 2 is removed. The molding cycle described above is then repeated.

The treating gas can contain 100% of some kinds of reactive gases, but is usually diluted with an inert gas such as nitrogen, carbon dioxide, argon and the like. When the recovered gas has been introduced into reserve tank 4, it is diluted with the purging gas, consequently the reactive gas component becomes too greatly diluted and it is necessary to supply an additional amount of the reactive gas component into reserve tank 4. Make-up gas cylinder 17 which contains a reactive gas component such as fluorine is connected to reserve tank 4 by means of treating gas line 18. This permits one to adjust the treating gas in reserve tank 4 to a certain level of pressure and reactive gas component concentration (e.g. 2 volume percent fluorine/98 volume percent nitrogen and 7 kg/cm.² absolute) before proceeding with the next blow molding cycle. Treating gas line 18 is equipped with pressure regulator valve 20 and solenoid valve 21 to satisfy this requirement.

Gas refining column 22 is installed in recovery line 12 prior to gas reserve tank 4. Column 22 contains a suitable adsorbent to remove moisture and other contaminents from the gas which is recycled. In addition, solenoid valve 23 and check valve 24 are installed in recovery line 12, which are designed to control the flow into reserve tank 4. Liquefied carbon dioxide or nitrogen can be used as the purging gas which simultaneously serves to cool the resulting blow molded container. This improves the productivity and the quality of the blow molded articles. Usually, the purging gas is inert, such as nitrogen and is introduced at room temperature during the recovery step. After the reserve tank has reached its upper pressure level, the purging gas is switched to an inexpensive one such as air at room temperature to complete the purging operation as discussed above. Since the purging pressure is higher than the blowing pressure as previously described, the amount of gas equivalent to this pressure differential is recovered and stored within reserve tank 4. Therefore, the pressure of reserve tank 4 coincides with the pressure of the purging gas. The size of reserve tank 4 is calculated so that the recovered gas volume during the initial purging operation is substantially equal to the necessary volume of the blowing gas for one blowing cycle.

The moisture and other contaminents in the recovered gas from reserve tank 4 are removed by refining column 22 as discussed above. It is also contemplated to install such a column to remove these contaminates at reserve tank 4 or in blowing gas line 7.

The recovery efficiency of the reactive gas component is influenced by the pressure differential of the purging gas and the blowing gas with the larger the differential, the higher is the efficiency of the present process. It has been found in simulated tests using air as the treating gas with the oxygen simulating the reactive gas that a recovery of up to around 60% is possible.

Therefore, in accordance with the present invention the expensive reactive gas component can be recovered and recycled after adjusting the pressure and reactive gas concentration as the blow molding treating gas which has been needlessly exhausted in the prior art processes.

What is claimed is:

1. In a process for the production of a blow molded thermoplastic article comprising the steps of extruding the thermoplastic material into a molten state to form a parison, introducing from a storage means a blowing gas containing a reactive gas component into the parison and expanding said parison to form the resulting blow molded article, the improvement which comprises:

adjusting within said storage means said blowing gas to a preselected level of pressure and concentration of said reactive gas before introducing the blowing gas into said parison, purging said blowing gas from the interior of said blow molded article with a purging gas, recovering a mixture of said purging gas and said blowing gas containing a high concentration of the reactive gas component, during an initial stage of said purging, in said storage means and disposing of the remaining mixture of blowing gas and purging gas after the pressure and reactive gas component concentration reaches a preselected level in said storage means.

2. The process of claim 1 wherein said blowing gas is recovered until the pressure in said storage means is at least slightly higher than the blowing gas pressure.

3. The process of claim 2 wherein the level of concentration of said reactive gas component in said blowing gas is in the range of about 0.1 to 10% by volume.

4. The process of claim 3 wherein the reactive gas component is fluorine.

5. The process of claim 2 wherein the pressure level in said storage means is maintained from 0.5 to 3 kg./cm.² higher than that of the blowing gas pressure.

6. The process of claim 2 wherein said thermoplastic is selected from the group consisting of polymers and copolymers of styrene, acrylonitrile, vinyl chloride, and olefins of at least one aliphatic mono-1-olefin having a maximum of 8 carbon atoms per molecule.

7. The process of claim 2 wherein the gas remaining in said blow molded article after the desired pressure level in said storage means is reached is scrubbed in a scrubbing means to remove said reactive gas component.

8. The process of claim 1 wherein said purging gas is at room temperature.

9. The process of claim 1 wherein the purging gas is a liquefied gas at a low temperature.

10. In the process of claim 1 wherein said purging gas is selected from the group consisting of nitrogen, carbon dioxide, argon, air and mixtures thereof.

11. The process of claim 1 wherein said reactive gas component is selected from the group consisting of fluorine, sulfur dioxide, carbon monoxide, oxygen, chlorine, bromine, or mixtures thereof.

12. The process of claim 1 wherein moisture and contaminants in said recovered gas mixture are removed by a refining column before entering said storage tank.

13. The process of claim 1 wherein said blowing gas is made up of 0.1 to 10 volume percent fluorine and 99.9 to 90 volume percent nitrogen.

14. The process of claim 13 wherein after said storage means has reached the preselected pressure and concentration, the purging gas is switched from nitrogen to air at room temperature.

* * * * *

UNITED STATES PATENT AND TRADEMARK OFFICE
CERTIFICATE OF CORRECTION

PATENT NO. : 4,394,333
DATED : July 19, 1983
INVENTOR(S) : Hatahiko Fukushima, Tadahiko Handa, and Kenji Kodama It is certified that error appears in the above-identified patent and that said Letters Patent is hereby corrected as shown below:

Cover Sheet
    Assignee: Air Products and Chemicals, Inc., Allentown, Pa. --should read-- Air Products and Chemicals, Inc., Allentown, Pa.; Daido Oxygen Company Ltd., Osaka, Japan

*Signed and Sealed this*

*Twenty-ninth* Day of *November 1983*

[SEAL]

Attest:

GERALD J. MOSSINGHOFF

Attesting Officer    Commissioner of Patents and Trademarks